United States Patent [19]

Harper

[11] 4,029,129

[45] June 14, 1977

[54] HELICAL PIPE LOCK SEAM

[76] Inventor: Laffie Harper, Box 276, San Bruno, Calif. 94066

[22] Filed: Mar. 26, 1976

[21] Appl. No.: 670,775

[52] U.S. Cl. .............................. 138/135; 138/122; 138/154

[51] Int. Cl.² ........................................ F16L 11/16

[58] Field of Search ................ 138/122, 135, 154; 156/218

[56] References Cited

UNITED STATES PATENTS

| 2,763,292 | 9/1956 | Rjeski | 138/135 X |
| 3,340,901 | 9/1967 | Lombardi | 138/135 X |
| 3,815,639 | 6/1974 | Westerbarkey | 138/135 |
| 3,865,146 | 2/1975 | Meserole | 138/135 X |
| 3,938,558 | 2/1976 | Anderson | 138/135 X |

FOREIGN PATENTS OR APPLICATIONS 13,688  12/1896  Switzerland .................. 138/154

Primary Examiner—Richard E. Aegerter
Assistant Examiner—James E. Bryant, III

[57] ABSTRACT

A pipe formed by a helically coiled strip of ductile sheet metal of uniform width connected along its longitudinally extending edges by a seam, which seam is formed by the marginal portions of the strip along said edges. Said marginal portions are formed with parallel return bends extending longitudinally of said edges, which bends are in adjacent opposed relation and which marginal portions include flattened loops extending to the same side of said pipe from approximately one of said bends to the other with one of said loops enclosed within the other, and the said marginal portions are bent along a line spaced from and parallel with said bends to generally V-shape in cross sectional contour transversely of said marginal portions, whereby said bends are positioned in one of the sides of said V spaced from its apex with flattened portions of said loops extending across and to opposite sides of said apex.

3 Claims, 6 Drawing Figures

HELICAL PIPE LOCK SEAM

BACKGROUND OF THE INVENTION

As shown and described in my U.S. Pat. No. 3,220,234 of Nov. 30, 1965, the forming of pipe from a thin strip of ductile sheet metal by corrugating it and then helically coiling or winding the corrugated strip and forming a lock seam, is old.

The thinner the metal the greater the economy of manufacture and the ease of manufacture, therefore, structural improvements, particularly in the seam, are essential to compensate for the loss in the rigidity of the material. In use, the pipe may be subjected to relative high pressure, and while the corrugations facilitate the making of bends in its length, the seam, which is parallel with the corrugations, is placed under a strain sufficient, at times, to cause leakage at the seam. Also, in view of the light gauge of the metal and the narrowness of the strip forming the pipe, it is highly desirable that the seam be of a structure that will contribute to the rigidity of the pipe.

SUMMARY OF THE INVENTION

The pipe of the present invention is adapted to be made on a machine similar to that disclosed in the above mentioned patent, in which the strip of ductile sheet metal is continuously corrugated; and the longitudinally extending marginal portions are formed to interfit and to be crimped to form the lock seam as the strip is curved to form the pipe. These steps are automatic and simultaneous.

One of the objects of the invention is the provision of a lock seam in a helical lock seam pipe that more securely locks the seam against separation under all of the stresses to which the pipe is subjected, and the structure of which seam makes a tighter seal against leakage than heretofore.

Another object of the invention is the provision of a helically extending seam in a helical lock seam pipe that materially adds to the rigidity of the pipe.

Other objects and advantages may appear in the description and drawings.

DESCRIPTION OF THE PREFERRED EMBODIMENT

The machine for forming the helically wound pipe is similar to the one shown in my U.S. Pat. No. 3,220,234.

Figure 1:
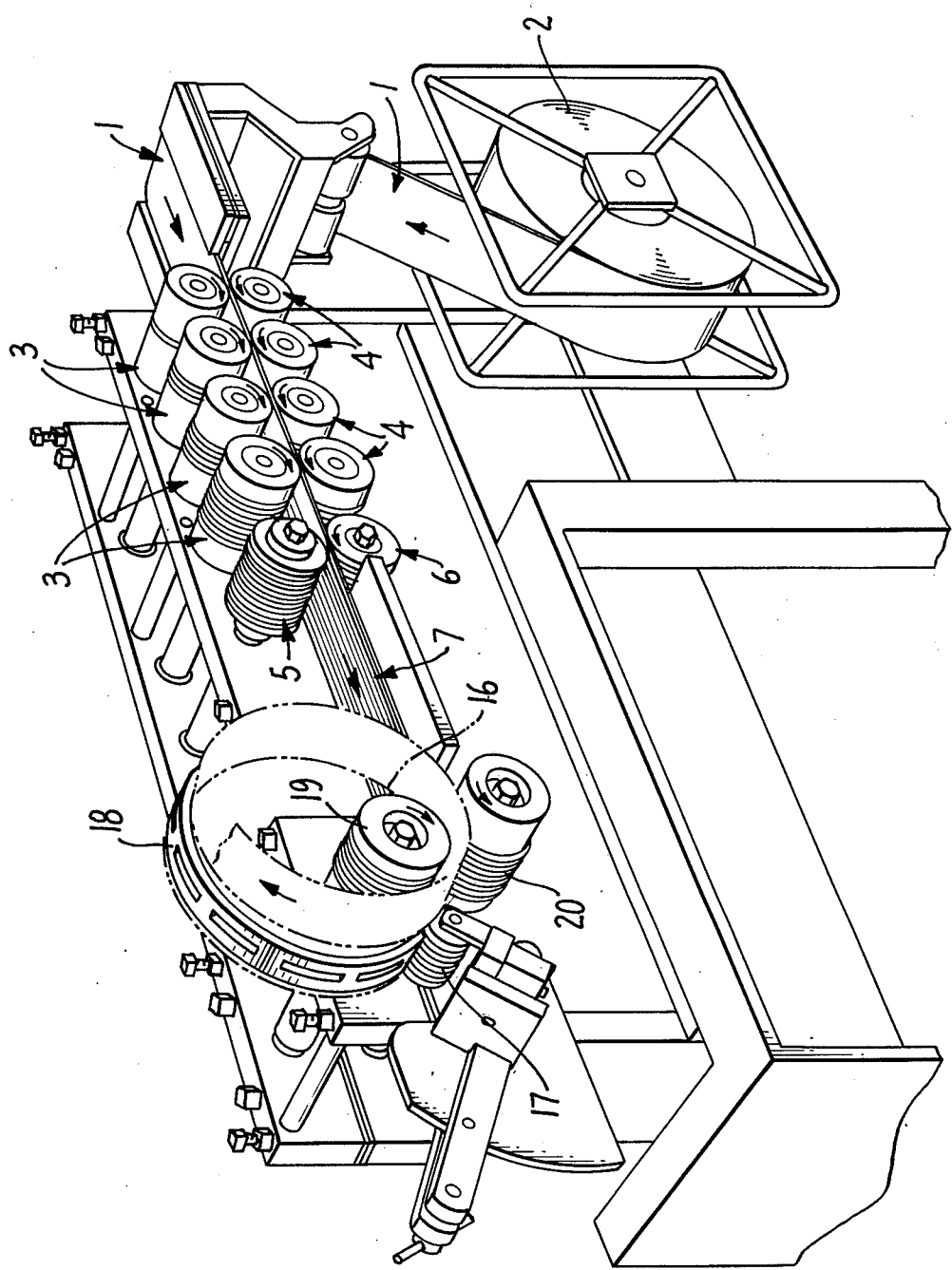
FIG. 1 is an isometric view of a machine adapted to make helical pipe embodying the seam of this invention.
Figure 2:
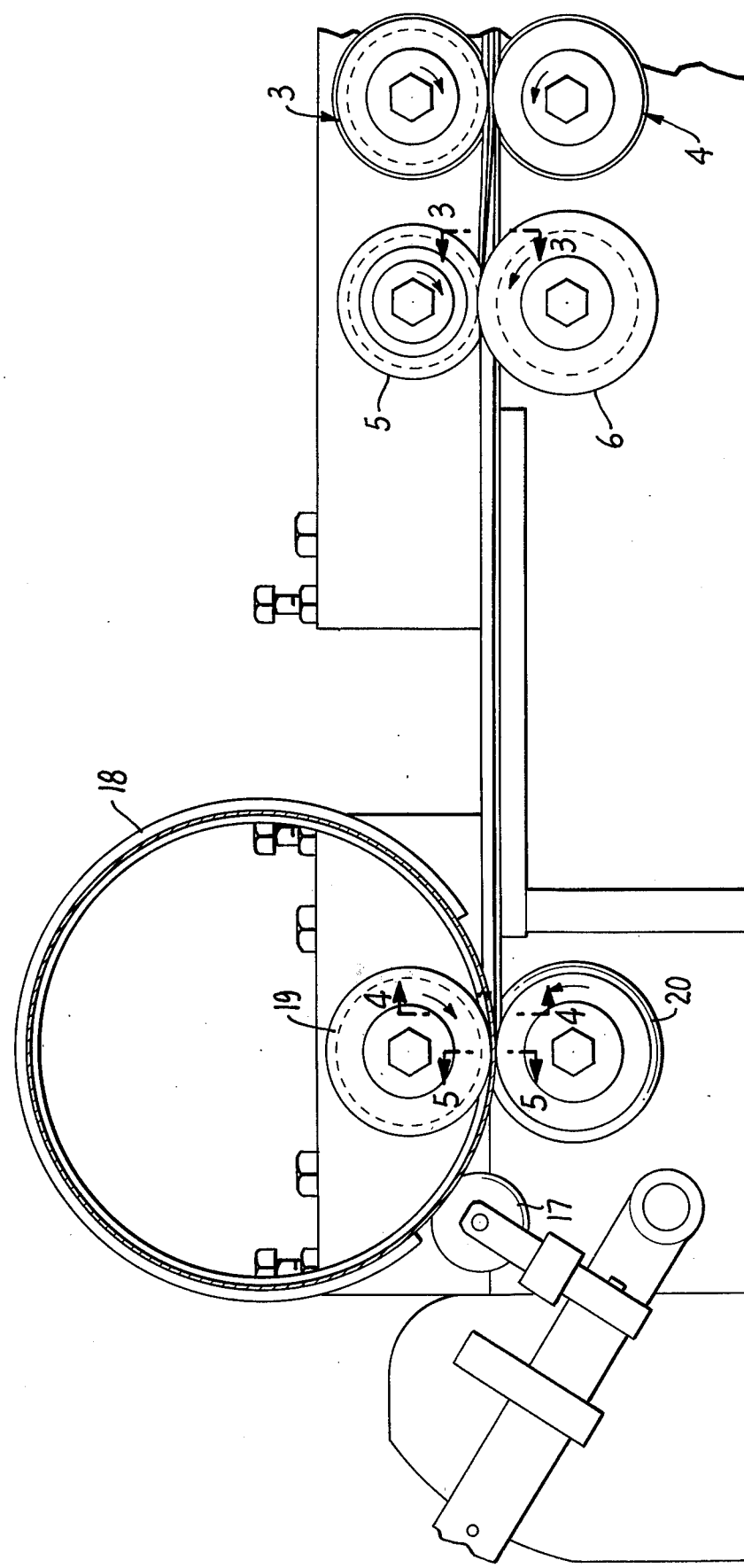
FIG. 2 is an enlarged fragmentary side elevational view of the seam forming end of the machine of FIG. 1.

A thin strip 1 of ductile metal, such as aluminum, is drawn from a roll 2 at the feed end of the machine (FIG. 1) over rollers to a horizontally extending position between an upper and a lower row of corrugating rollers. The rollers of the upper row are generally designated 3 and those of the lower row 4, with the exception of the upper roller 5 and the lower roller 6 that are at the ends of the row of rollers 3, 4 remote from the feed end of the machine. The upper rollers 3, 5 and the lower rollers 4, 6 progressively form the corrugations 7 in the central body of the strip 1 between its longitudinally extending marginal portions. The corrugations in said central portion are conventional, and the rollers are power driven to move the strip from right to left as viewed in FIGS. 1, 2.

Figure 3:
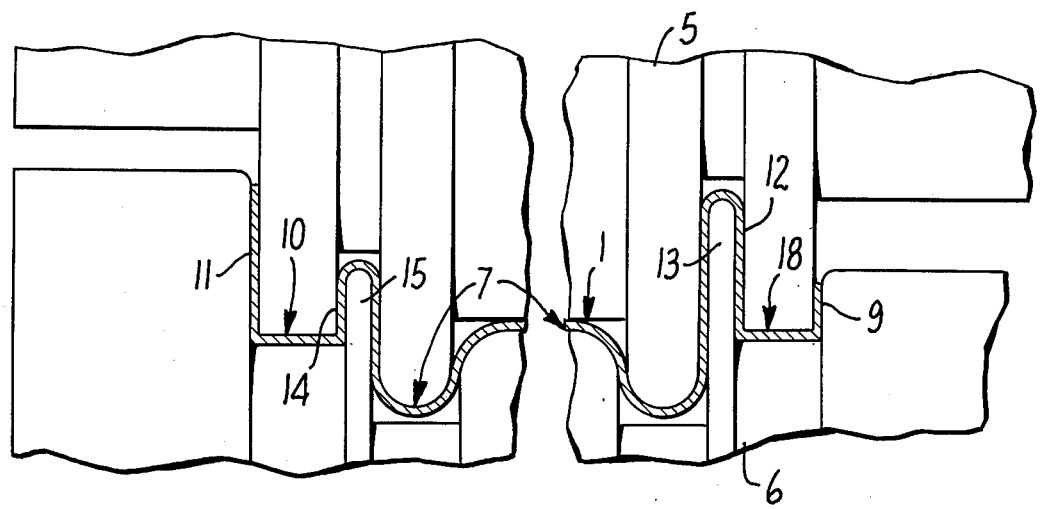
FIG. 3 is a greatly enlarged, fragmentary, cross sectional view at line 3—3 of FIG. 2, broken in length, showing the marginal portions of the strip for forming the pipe, a portion of the upper and lower rollers for forming the channels being shown in elevation so as not to detract from the strip.

The rollers 5, 6 are not conventional in that they form the marginal portions of the strip to make the seam. The right hand ends of said rollers 5, 6 looking in the direction of movement of the strip (FIG. 3) are adapted to form an upwardly opening channel 8 having a relatively short outer side 9 in the right hand marginal portion of the strip 1. The left hand ends of rollers 5, 6 form an upwardly opening channel 10 having a relatively tall outer side 11 compared to side 9.

The inner side 12 of channel 8 constitutes one side of a relatively tall, downwardly opening narrow channel 13, while the inner side 14 of channel 10 is a side of a relatively short, downwardly opening narrow channel 15. The height of side 9 may be approximately the height of the inside of channel 15, while the height of side 11 may be approximately the height of the inside of channel 13. The width of channel 8 is preferably slightly less than the width of channel 10, inasmuch as in the coiling step, as indicated in broken lines at 16 in FIG. 1, the channel 8 will fit within the channel 10.

Figure 4:
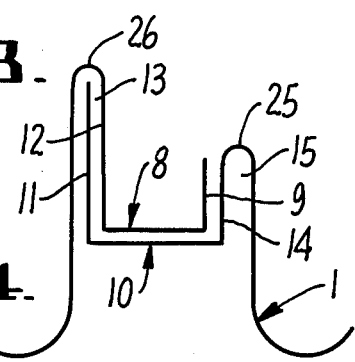
FIG. 4 is a diagrammatic view of the marginal portions seen in FIG. 3, except in single line and spaced apart, and in interfitted relationship as would appear at 4—4 in FIG. 2 before crimping by the seaming rollers.

After the marginal portions of strip 1 are formed by rollers 5, 6 to form the channels above described, the longitudinally moving strip engages as slightly angularly extending guide and coil forming roller 17 (FIGS. 1, 2) and is directed against a stationary annularly extending guide 18 for forming a helix in which the channel 8 will enter the channel 10 in the position shown in FIG. 4.

FIG. 4 is diagrammatic in that the material of the channels is shown in single lines spaced apart for clarity, and the channels are in this relative position to each other when they enter the crimping rollers 19, 20.

Figure 6:
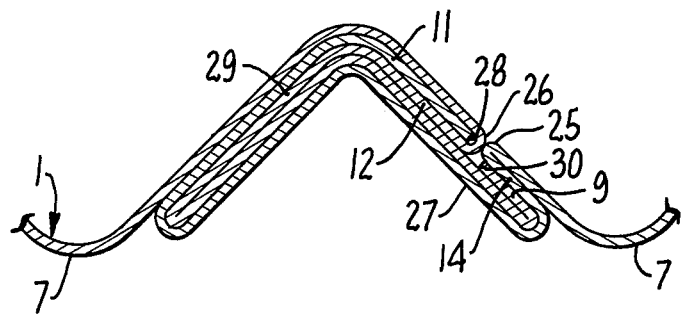
FIG. 6 is a still further enlarged cross sectional view of the seam that is formed by the rollers of FIG. 5.

The upper crimping roller 19 is formed with a generally V-shaped radially outwardly opening annular recess 21, while the lower roller 20 is formed with a radially outwardly projecting annular ridge 22 that is substantially complementary to recess 21 and extends into recess 21 for crimping the channels 8, 10, 13, 15 to form the generally V-shaped seam and corrugation shown in FIG. 6.

Figure 5:
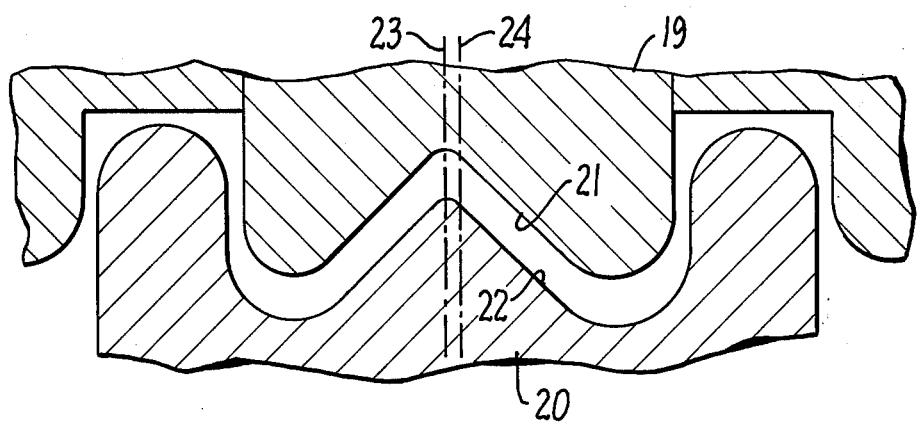
FIG. 5 is a greatly enlarged, fragmentary, cross sectional view of the crimping rollers at line 5—5 of FIG. 2 but without the strip between the rollers.

The apices of the recess 21 and ridge 22 are in a plane 23 (FIG. 5) that is slightly offset to the side of the medial plane 24 of rollers 19, 20 toward the channel 12, said planes being indicated in dot-dash lines. This insures that the sides of channel 8 and side 11 of channel 10 (FIG. 4) will extend or form over the apex of the V-shaped seam and terminate in one of the legs or sides of the V.

Referring to FIG. 6, upon the marginal portions of the strip shown in FIG. 4 passing through the crimping rollers, seams are formed with return bends 25, 26 from channels 15, 13, and a flattened loop 27 extends from the bend 25 back around and across a plane extending between and parallel with said bends 25, 26 to a terminal end 28 that is within and adjacent bend 26, while a flattened loop 29 extends from bend 26 back across said parallel plane to a terminal end 30 that abuts the side of and is adjacent to bend 25. The loop 29 is enclosed within loop 27 and the return bends 25, 26 are adjacent each other and at one of the sides of the generally V-shaped corrugation and seam formed by the layers of the flattened loops and spaced from the apex of the V. All layers of the flattened loops extend continuously across the apex of the seam, including the portion extending from return bend 26 to the central body of the strip. The V-shaped seam-corrugation comprises not less than five layers of the material of the marginal portions that are tightly crimped together.

The strip 1 is normally narrow in width and of light gauge ductile metal. The corrugations enable ready bending of the pipe to virtually U-shape about a relatively small radius, and in so bending, considerable strain is placed on the spirally or helically extending seam, tending to flatten out the seam at the apex. In the structure above described the layers of material extending continuously across the apex of the seam more strongly resists separation and consequent leakage at the seam than heretofore, while the angularly extending sides of the V seam materially adds to the rigidity of the pipe against undesirable distortion.

I claim:

1. In a pipe formed from a helically coiled strip of ductile material having a main body connected along its longitudinally extending edges by a seam, said seam comprising:
   a. first and second marginal portions respectively along and parallel with said edges having adjacent return bends at opposite sides of a plane extending between and parallel with said bends;
   b. said marginal portions including flattened loops disposed at the same side of said plane, each extending from one of said bends to substantially the other, with one of said loops enclosed within the other;
   c. said loops being bent along a line spaced from and parallel with said bends forming a generally V-shaped corrugation in cross sectional contour transversely of said bends with said bends positioned in one of the sides of said corrugation and with flattened portions of said loops extending across and along opposite sides of the apex of said corrugation.
2. In a pipe as defined in claim 1, in which
   d. said main body between said marginal portions is formed with a row of corrugations parallel with said V-shaped corrugation and of substantially the same depth as that of the latter, and said main body joining said marginal portions at the divergent ends of said V-shaped corrugation.
3. In a pipe as defined in claim 2, in which
   e. each of the sides of said V-shaped corrugation, including said apex thereof, having at least five layers of the material of said marginal portions, and said layers being continuous across said apex.

* * * * *